US011412856B2

(12) United States Patent
Himmelhuber

(10) Patent No.: US 11,412,856 B2
(45) Date of Patent: Aug. 16, 2022

(54) ARMREST

(71) Applicant: Erwin Himmelhuber, Sulzbach-Rosenberg (DE)

(72) Inventor: Erwin Himmelhuber, Sulzbach-Rosenberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/722,774

(22) Filed: Dec. 20, 2019

(65) Prior Publication Data

US 2020/0345146 A1   Nov. 5, 2020

(30) Foreign Application Priority Data

Jan. 11, 2019  (DE) .................... 102019000119.2

(51) Int. Cl.
  *A47C 7/54* (2006.01)
  *B60N 2/75* (2018.01)

(52) U.S. Cl.
  CPC .............. *A47C 7/543* (2013.01); *B60N 2/757* (2018.02)

(58) Field of Classification Search
  None
  See application file for complete search history.

(56) References Cited

U.S. PATENT DOCUMENTS

| | | | | |
|---|---|---|---|---|
| 4,040,665 A | * | 8/1977 | Wallace | B60N 2/753 |
| | | | | 297/411.32 |
| 4,159,145 A | * | 6/1979 | Quakenbush | A47C 7/543 |
| | | | | 297/113 |
| 6,217,119 B1 | * | 4/2001 | Cook | A47C 7/543 |
| | | | | 297/112 |
| 6,471,297 B1 | | 10/2002 | Runde | |
| 6,752,462 B1 | | 6/2004 | Kain | |
| 7,255,402 B1 | | 8/2007 | Haddad et al. | |
| 10,506,881 B2 | * | 12/2019 | Richardson | A47C 7/543 |
| 10,524,573 B2 | * | 1/2020 | Richardson | A47C 3/00 |

(Continued)

FOREIGN PATENT DOCUMENTS

| CN | 204801571 U | 11/2015 |
|---|---|---|
| CN | 106080315 A | 11/2016 |

(Continued)

*Primary Examiner* — David E Allred
(74) *Attorney, Agent, or Firm* — Andrew Wilford

(57) ABSTRACT

Armrest (10) comprising a base (19) and an arm (13) that can be moved by a mount (17) between at least one use position and a non-use position, wherein the arm (13) is movable by the mount (17) axially of a pivot axis (a) between a proximal and a distal position, and is pivotable about the pivot axis (a) between a primary and a secondary position, wherein the armrest (10) has an actuator (30) comprising a motor drive having a drive part (29) that is movable between a first and a second position in order to displace the arm (13) in a first direction ($y_1$) between the non-use position and the use position, at least in part, wherein the actuator (30) has at least one spring (21) that can be tensioned upon movement of the drive part (29) or an additional drive part (29) of the actuator (30), wherein the arm (13) can be moved axially, in a second direction ($y_2$) by the spring (21), which second direction is directed opposite the first direction ($y_1$).

13 Claims, 8 Drawing Sheets

(56) References Cited

U.S. PATENT DOCUMENTS

| | | | | |
|---|---|---|---|---|
| 2006/0267382 A1* | 11/2006 | McMillen | ............... | B60N 2/20 297/115 |
| 2010/0045067 A1* | 2/2010 | Schulz | .................. | B60N 2/753 296/153 |
| 2010/0289317 A1 | 11/2010 | Cone | | |
| 2012/0098317 A1 | 4/2012 | Kim | | |

FOREIGN PATENT DOCUMENTS

| | | |
|---|---|---|
| CN | 206406782 U | 8/2017 |
| DE | 102006007893 B | 9/2007 |
| DE | 202015103426 U | 11/2015 |
| DE | 202015103426 U1 | 11/2015 |
| FR | 2885329 A | 11/2006 |
| JP | 2005096485 A | 4/2005 |

\* cited by examiner

ARMREST

FIELD OF THE INVENTION

The invention relates to an armrest for a seat, in particular for a vehicle seat. An armrest of this kind comprises a base part and an arm that is pivotably mounted on the base part. The arm is movable relative to the base about the pivot axis between a non-use and a use position.

BACKGROUND OF THE INVENTION

EP 1 311 177 [U.S. Pat. No. 6,471,978] discloses an armrest comprising a guide means that has two coaxial sleeves, wherein one sleeve is retained on the seat structure and a second sleeve is retained on the arm. A link is formed in the first sleeve, in which link a pin that is rigidly connected to the second sleeve engages. The link extends helically in the peripheral direction and in the longitudinal direction of the first sleeve. In this manner, when moved from the non-use position into the use position, the arm is also moved in the longitudinal direction of the pivot axis, in addition to the pivot movement.

DE 20 2015 103 426 describes an armrest comprising an arm that is displaceable relative to a base part, in the longitudinal direction of the pivot axis, and pivotable about the pivot axis in order to move the armrest between a non-use position and a use position, and to store it, in the non-use position, in a manner requiring less space.

The armrest according to DE 10 2007 014 232 [U.S. Pat. No. 7,255,402] is displaceable relative to a base, in the longitudinal direction of a pivot axis, and pivotable about the pivot axis between a vertical and a horizontal position. In this way, the arm can be stowed in a recess of the seat, when in the non-use position, and does not occupy any space to the side of the seat.

The armrest according to FR 2 885 329 comprises a base, an arm, and an intermediate element. Together with the base, the intermediate element forms a first swivel joint having a vertical pivot axis. Together with the intermediate element, the arm forms a second swivel joint having a horizontal pivot axis. When moving from a stowage position into a use position, the arm is pivoted about the vertical pivot axis and subsequently in addition about the horizontal pivot axis.

OBJECT OF THE INVENTION

The object of the invention was that of providing an armrest that is movable in the longitudinal direction of the pivot axis and is pivotable about the pivot axis, wherein movement between a stowage position and the use position, and the return movement, can be performed more easily.

SUMMARY OF THE INVENTION

The armrest according to the invention comprises a base and an arm that can be moved by a mount between at least one use position and a non-use position. The base is formed for example by a vehicle structure or the structure of a seat. The base can for example also be formed by a part that is rigidly connected to a seat.

The mount guides the arm upon movement between the non-use position and the at least one use position. During movement between the non-use position and the use position, the arm performs both a movement axially of the longitudinal direction of the pivot axis, and a rotational movement about the pivot axis. The arm is movable, for example by an axial guide, in a first direction between an inner and an outer position relative to the base, and is pivotable by a rotational guide between a primary and a secondary position. Movement axially of the longitudinal direction of the pivot axis, and the rotational movement about the pivot axis, can be performed successively or at the same time. The guide can for example be formed by a link in which a sliding block is guided.

The armrest has an actuator comprising a motor drive. The motor drive is provided with a drive part that is movable angularly in a first direction between a first and a second position in order to displace the arm between the non-use position and the use position, at least in part. For example, the drive part displaces the arm merely axially between the inner and the outer position. Within the meaning of the invention, the terms "first direction" and "second direction" are not to be understood merely as simple spatial directions, but can also be understood as an orientation on a motion path that is covered for example in opposing directions.

The motor drive is formed for example by a linear drive. Other drives are alternatively also possible, however. The linear drive is formed for example by a spindle that interacts with a spindle nut, wherein the spindle or the spindle nut is driven by a motor in order to move the drive part between the first and the second position.

The actuator has for example a spring that can be tensioned upon movement of the drive part or of a separate second drive part between the first position and the second position. The spring also allows for the arm to be moved axially in a second direction that is directed opposite the first direction. If a separate drive part is provided for tensioning the spring, the actuator has for example a separate motor therefor, for the purpose of driving the drive part. The spring can be tensioned for example upon a movement of the drive part from the first position into the second position. Alternatively, the spring can be tensioned upon movement of the drive part from the second position into the first position.

The invention is advantageous inter alia in that moving the arm by the spring, in part, makes it possible to prevent the risk of jamming, without complex sensors or overload protection means being required therefor. If for example the critical movement of the arm from the use position into the non-use position, in which there is a risk of a seat occupant's extremities becoming trapped between the arm and the seat, is performed by spring force, injuries are prevented.

One embodiment is characterized in that the base is provided with first guide element that interact with second guide element that are associated with the arm. The first guide element and the second guide element form for example an axial guide and/or a rotational guide for the arm. The first and second guide element guide the arm, for example upon movement between the inner and outer position and/or upon movement between the primary position and the secondary position.

The first guide element and/or the second guide element are formed for example by a tube, and the guide elements are movable telescopically with respect to one another. This embodiment is space-saving, since, in the non-use position, the first and the second guide element are nested, and in the use position are arranged having only a slight overlap. Furthermore, if the first and the second guide element are formed by a tube there is space available in the interior of the inner tube for further components of the armrest.

One embodiment is characterized in that, upon a movement of the drive part between the first position and the second position, the second guide element are displaceable relative to the first guide element between the inner position and the outer position. The second guide element are for example linearly displaceable between the inner position and the outer position. The second guide element are therefore displaced from the inner position into the outer position, or from the outer position into the inner position by the motor drive of the drive part. In the inner position and/or in the outer position, the two guide elements can for example be latched such that a return movement is possible only in a specified position of the arm.

In an armrest according to the invention, the second guide element comprises a stop face that interacts with a driving surface of the drive part such that the second guide element are entrained when the drive part moves in a first direction, and are detachable from one another in the case of a movement in a second direction. Since the drive part is only loosely connected to the second guide element, it is possible for the second guide element to be entrained only upon one of the movements, from the first position into the second position, of the drive part, or from the second position into the first position, of the drive part, and is able to detach from the second guide element in the case of the opposing movement.

One embodiment is characterized in that a tension rod is rigidly connected to the drive part or to a separate drive part of the actuator, and in that a first spring end of a spring is supported on the tension rod. The drive part can move the tension rod such that the spring is tensioned and loads the second guide element into the inner position or into the outer position. The same drive part can be used for movement of the tension rod as moves the second positive connection means, or a separate drive part of the actuator that is provided with a separate drive. In order to move the second guide element, for example a second spring end is supported on a contact surface of the second guide element. A first spring end is supported for example on a contact surface of the tension rod.

In particular, for example in the case of a movement of the drive means from the first position into the second position, the second guide mans can be moved out of the inner position and into the outer position. Alternatively, in the case of a movement of the drive part from the second position into the first position, the second guide element can be moved out of the outer position and into the inner position.

In the case of a return movement of the drive part from the second position into the first position, the spring can be tensioned by the tension rod. Alternatively, the tension rod is moved by the drive part, upon the return movement from the first position into the second position, such that the spring is tensioned.

In addition, the arm can be moved into contact with a separate spring, approximately 20° before reaching the secondary position, which spring brakes the arm at this swivel angle, wherein the spring is tensioned.

One embodiment is characterized in that a damper is provided for damping the pivot movement of the arm from the non-use position into the use position. In this way, the arm is pivoted into the use position in a damped manner.

According to a further embodiment, the pivot movement of the arm is assisted by a spring. For example, movement of the arm from an approximately vertical position into an approximately horizontal position may be spring-loaded. Alternatively, movement of the arm from the horizontal position into the vertical position may be spring-loaded.

BRIEF DESCRIPTION OF THE DRAWING

Further advantages of the invention can be seen with reference to an embodiment that is shown schematically in the figures. In said figures.

The armrest is denoted overall in the figures by reference sign 10. The same reference signs in different figures denote corresponding parts, even if lower-case letters follow or are omitted.

Figure 1:
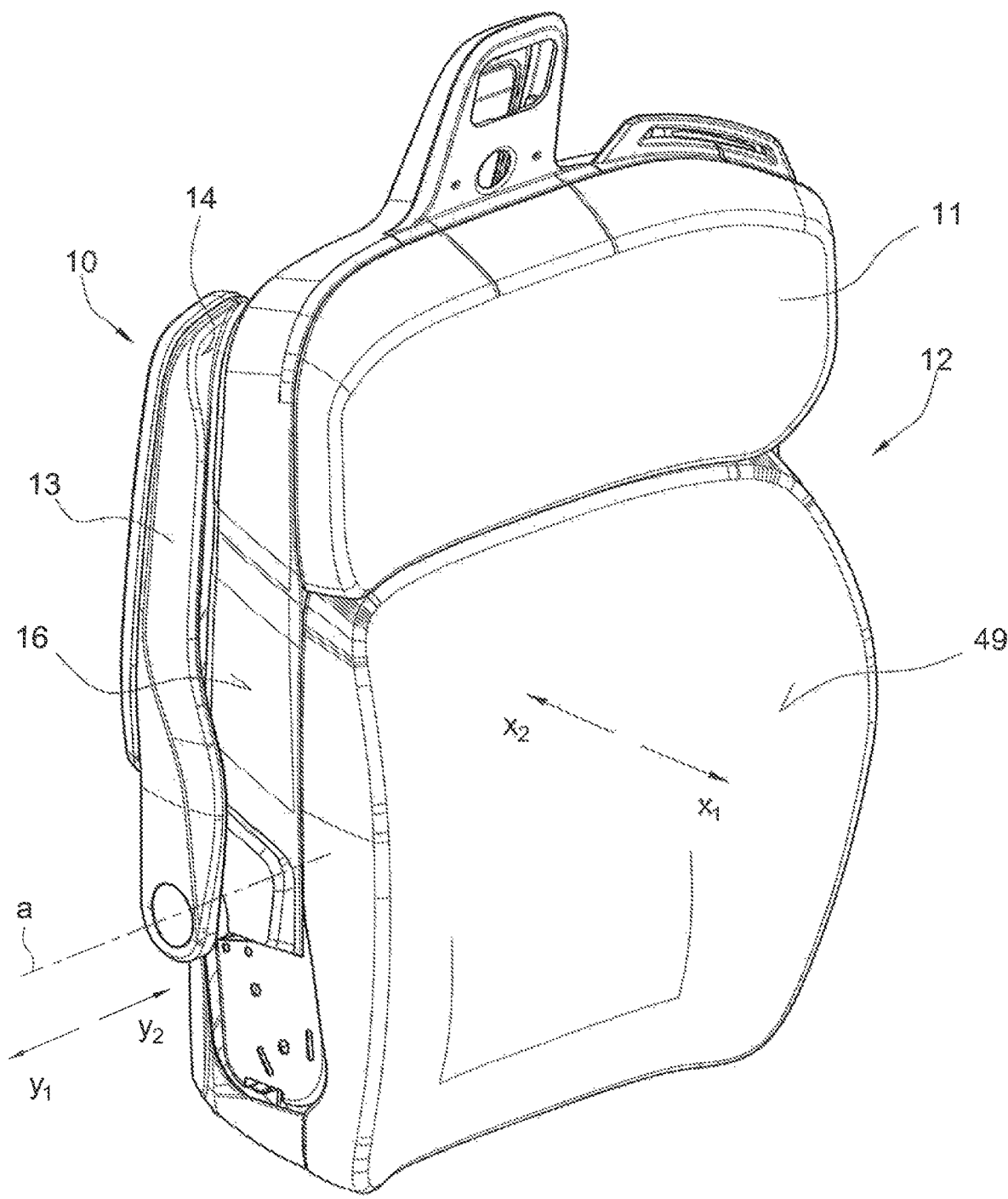
FIG. 1 is a perspective view of a backrest of a vehicle seat comprising an armrest according to the invention, wherein the armrest is in an up non-use position.

According to FIG. 1, the armrest 10 is fastened to the backrest 11 of a vehicle seat 12. A front face 49 of the backrest 11 faces in a forward direction $x_1$. The direction $x_1$ corresponds for example to the straight travel direction of the vehicle, while the rear face 15 of the backrest is oriented in the opposite rearward direction $x_2$.

The seating surface of the vehicle seat is not shown. In FIG. 1, the armrest 10 is in an inner non-use position, in which a lower face 14 of an arm 13 opposes the rear face 15 (not visible in FIG. 1) of the backrest 11 at least in part. According to the invention, in the FIG. 1 inner non-use position the arm 10 protrudes laterally only slightly, or not at all, beyond a side face 16 of the backrest 11.

Figure 2:
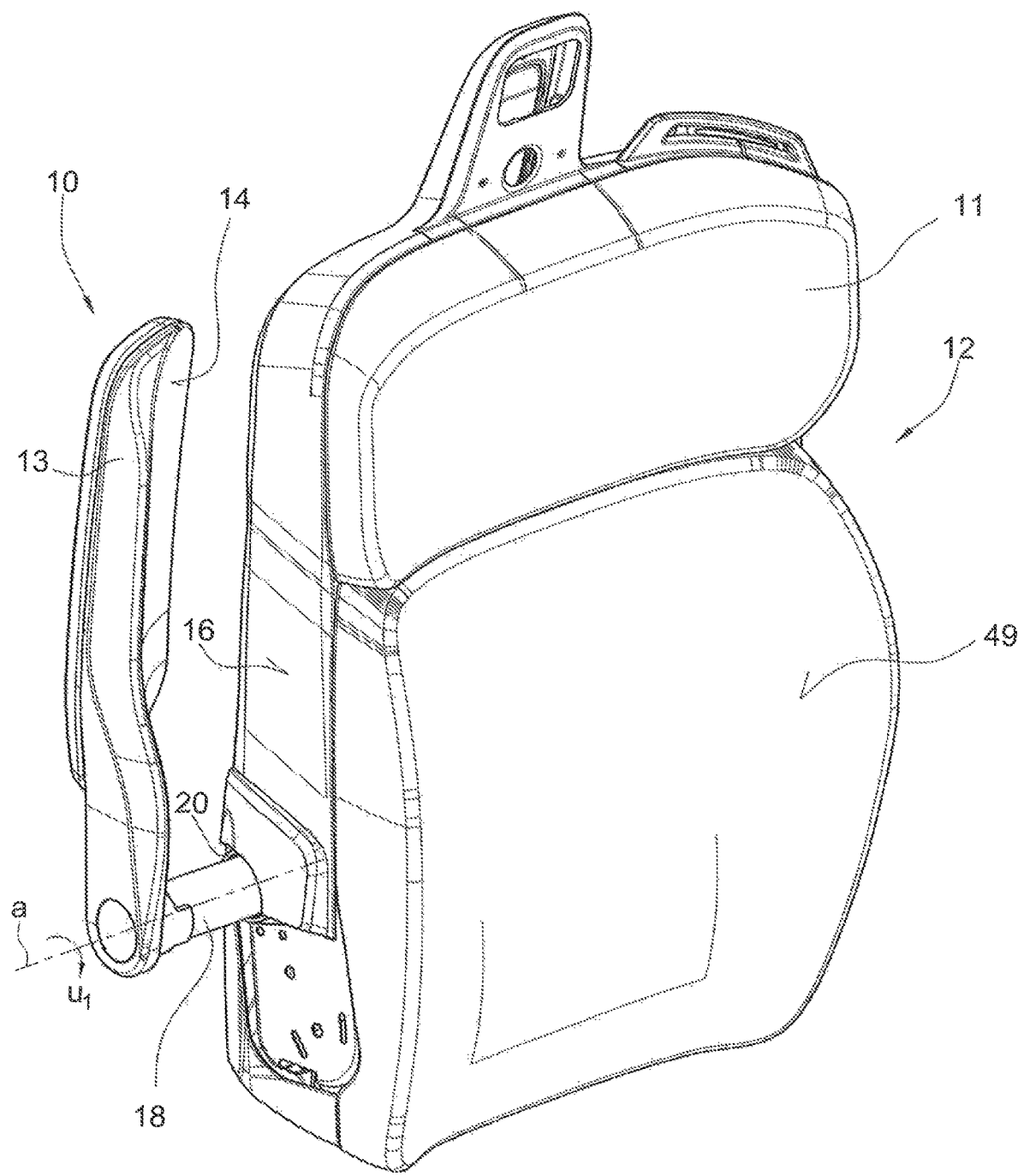
FIG. 2 is a view of the backrest based on FIG. 1, wherein the arm is moved in the longitudinal direction of the pivot axis, from a inner position into an outer position.
Figure 3:
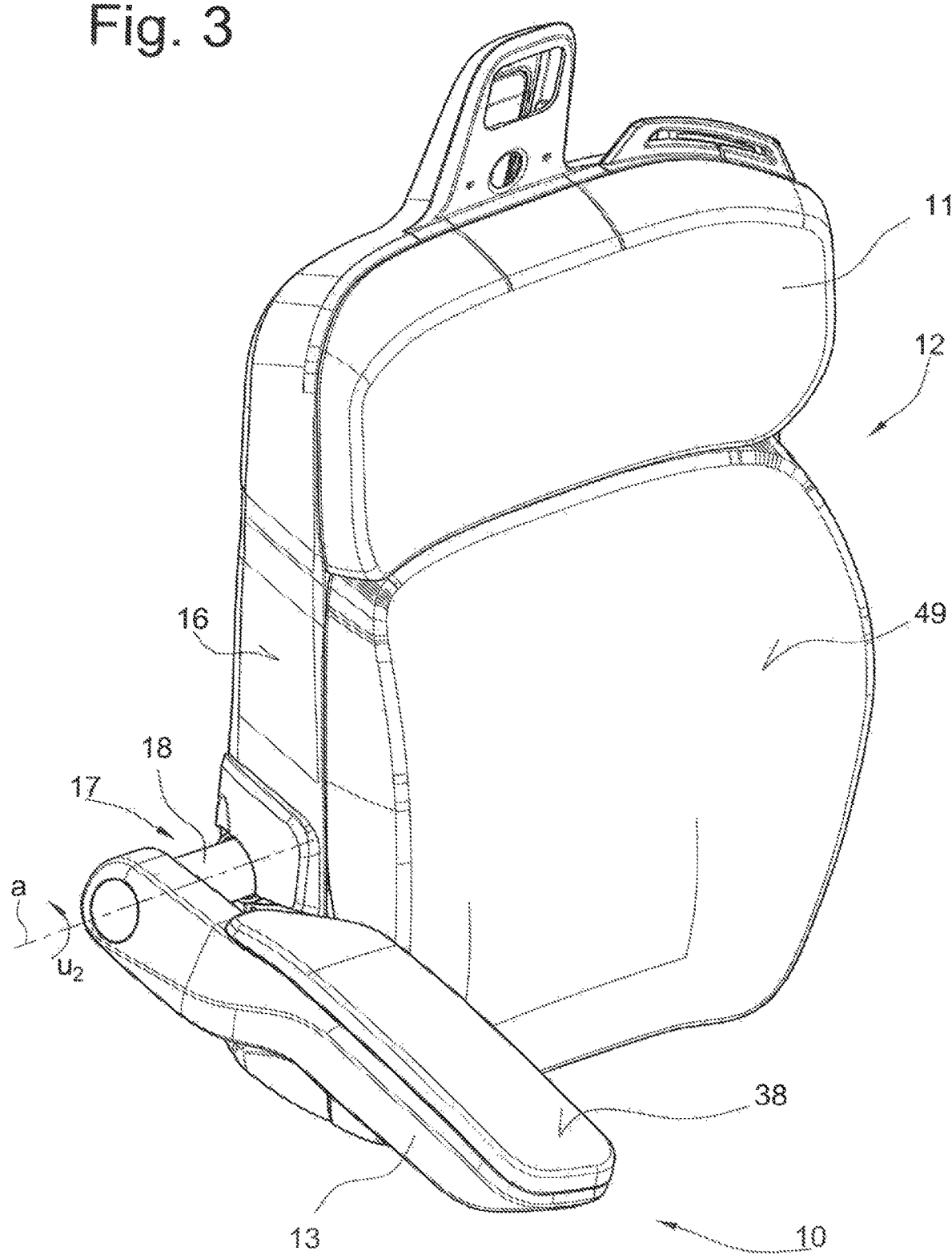
FIG. 3 shows the backrest based on FIG. 2, wherein the armrest is pivoted into a down use position.
Figure 4:
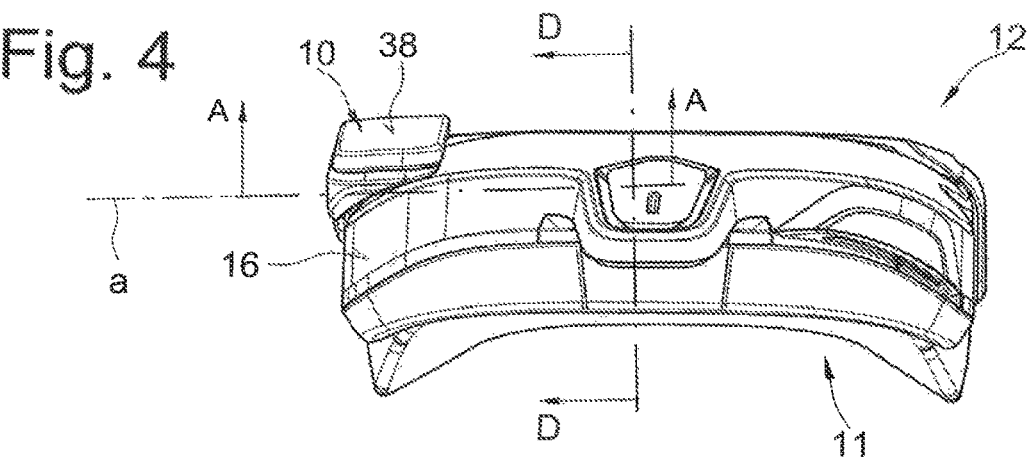
FIG. 4 is a plan view of the backrest according to FIG. 1.
Figure 5:
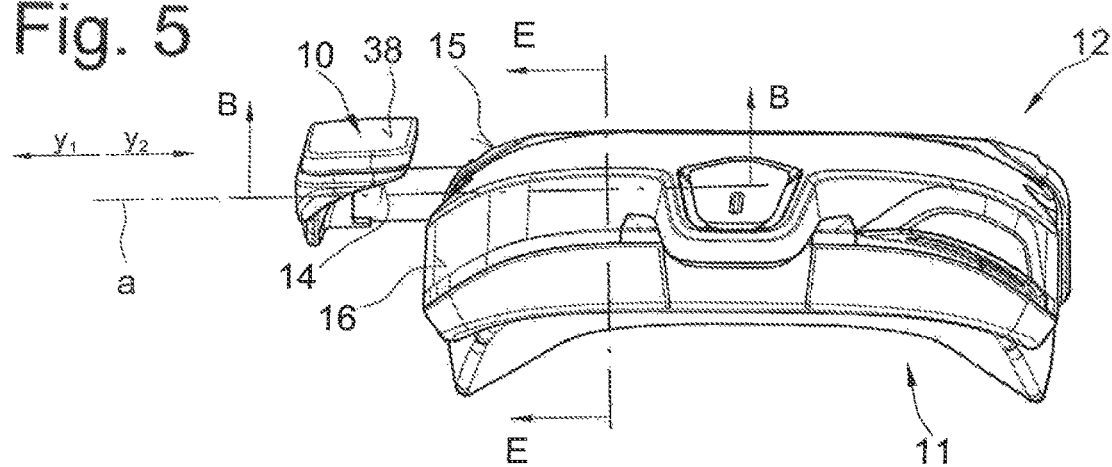
FIG. 5 is a plan view of the backrest according to FIG. 2.
Figure 6:
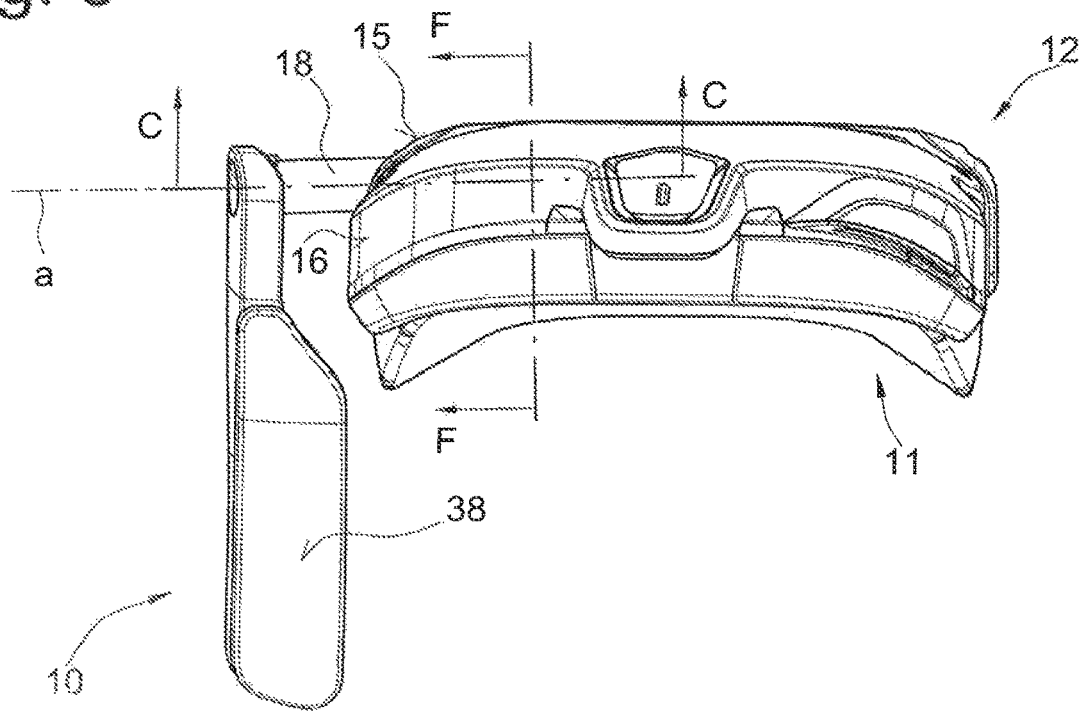
FIG. 6 is a plan view of the backrest according to FIG. 3.

The arm 13 is movable axially of the longitudinal direction of a pivot axis a, in the directions $y_1$ and $y_2$, and pivots about the pivot axis a in angular directions $u_1$ and $u_2$ (see FIGS. 2 and 3). In order to move the arm 13 out of the inner non-use position shown in FIG. 1 and into a use position, the arm 13 is first moved axially, in the direction $y_1$, out of an inner non-use position according to FIGS. 1 and 4 and into an outer non-use position according to FIGS. 2 and 5, until the lower face 14 is located entirely to the side of a side face 16 (see FIG. 2) of the seat back 11 and an opposite face 38 of the arm 13 faces rearward in direction $x_2$. Subsequently, the arm 13 is pivoted about the pivot axis a in direction $u_1$, into a down use position shown in FIGS. 3 and 6 in which the face 38 is directed upward and the face 14 downward.

Figure 7:
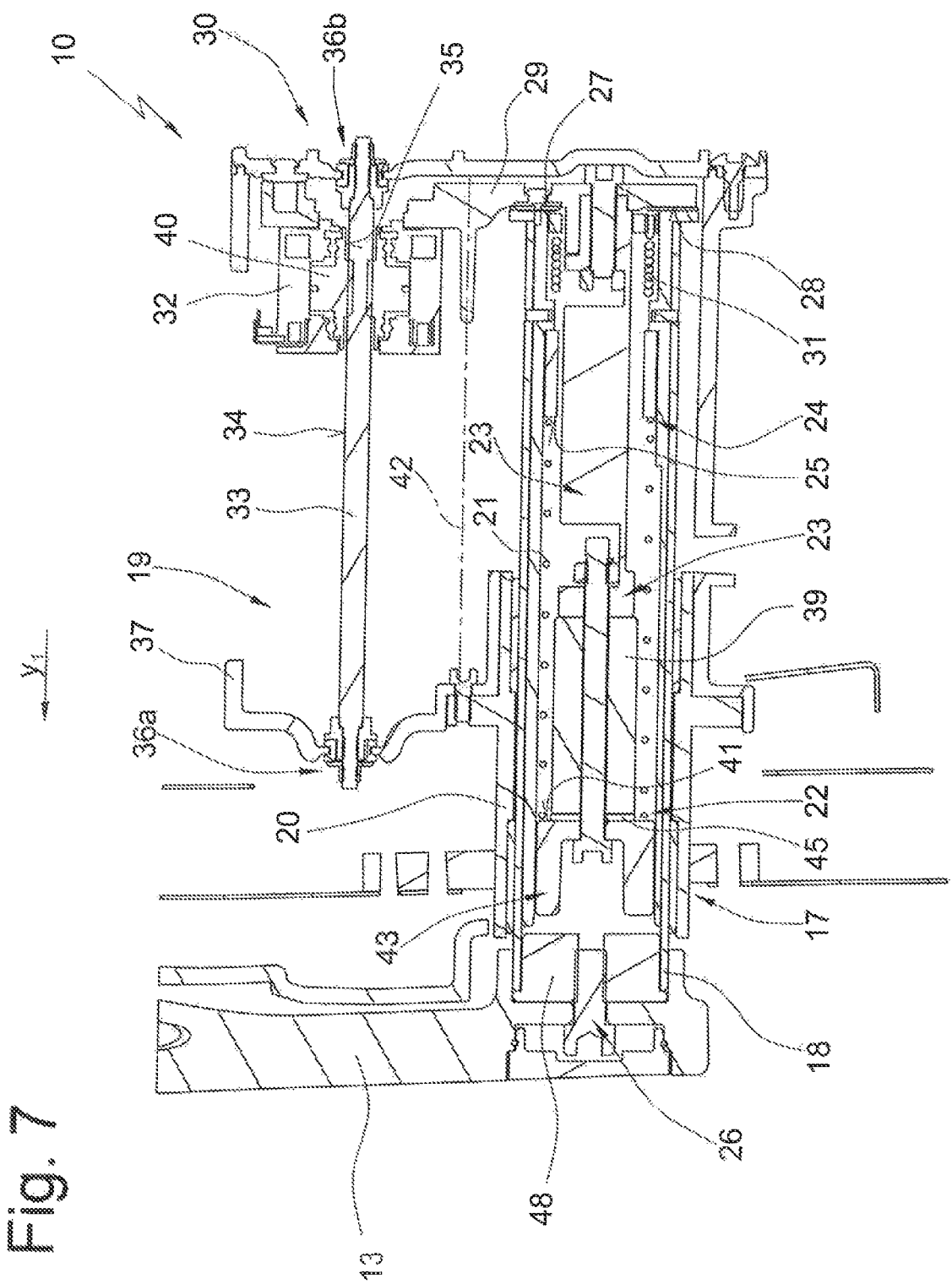
FIG. 7 is a sectional view according to the cutting line A-A in FIG. 4.
Figure 8:
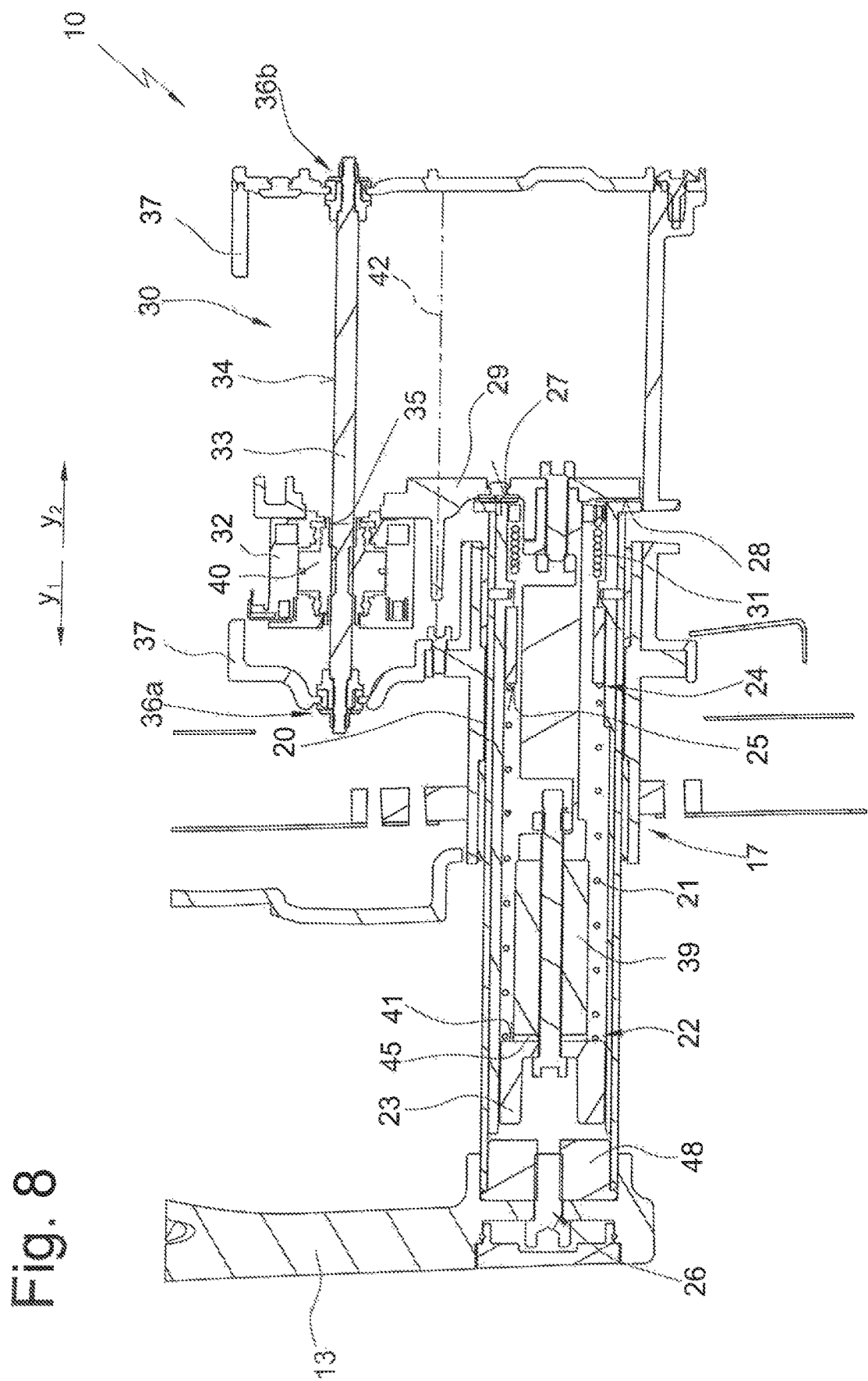
FIG. 8 is a sectional view of the armrest according to the cutting line B-B in FIG. 5.
Figure 9:
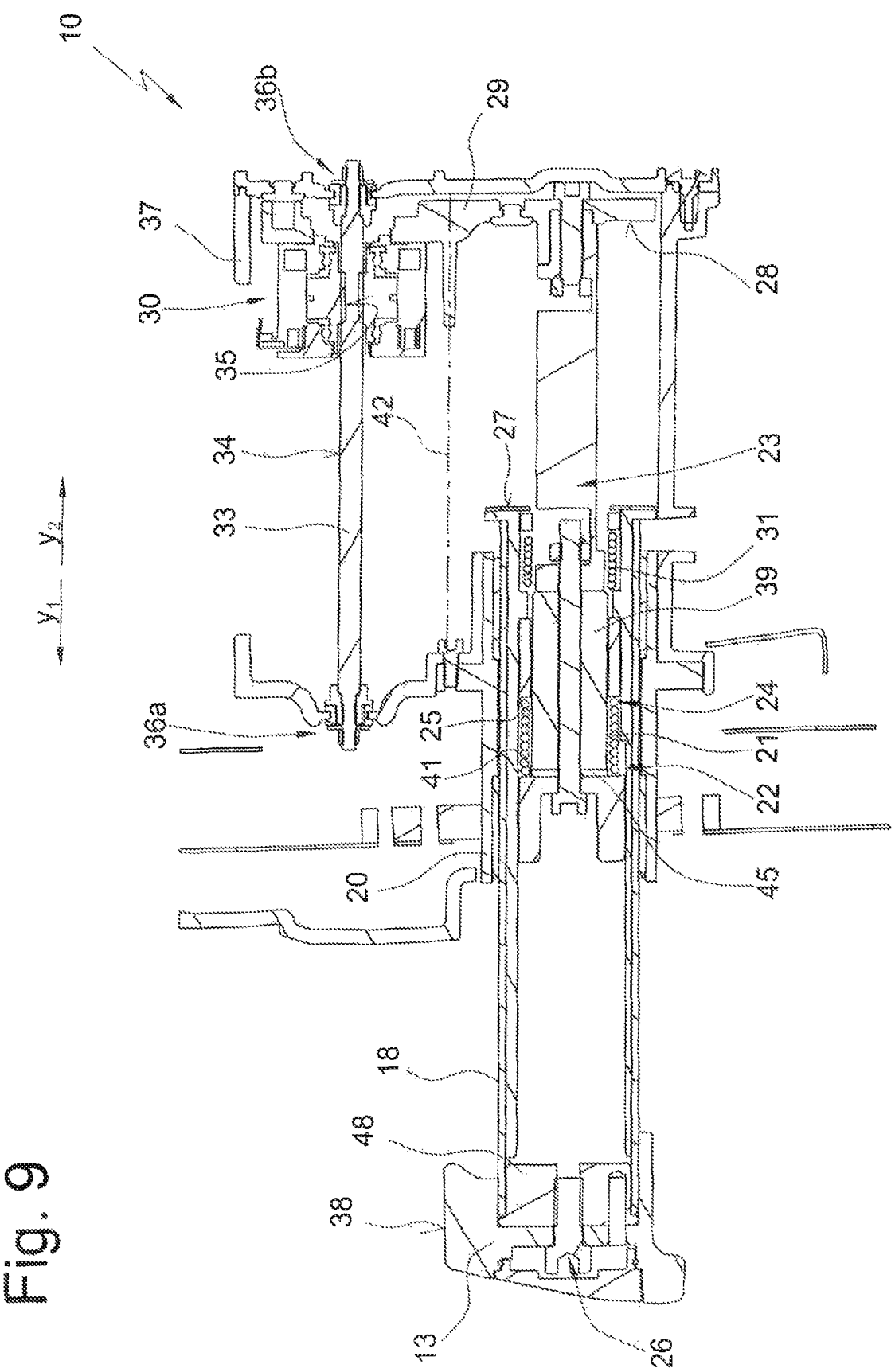
FIG. 9 is a sectional view according to the cutting line C-C in FIG. 6.

The arm 10 has a mount 17 (see FIG. 7) that guides the arm 13 in the longitudinal/axial direction of the pivot axis a between an inner position according to FIGS. 1 and 7 and an outer position according to FIGS. 2 and 8 on movement in direction $y_1$ and $y_2$, and that guides the arm 13 between a primary up position according to FIG. 8 and a secondary down position according to FIG. 9 on movement in the pivot directions $u_1$ and $u_2$.

The mount 17 has a second guide element in the form of a sleeve 18 rigidly connected via an end piece of the sleeve 18 to the arm 13 by a fastener 26 and a nut 48, and a first guide element in the form of a sleeve 20 rigidly connected to a base 19. In this embodiment, the base 19 has a housing 37 that is rigidly connected to the structure of the backrest 11. The sleeves 18 and 20 are coaxial to the pivot axis a and relatively telescopically movable, i.e. the sleeve 18 is movable in direction $y_1$ and $y_2$ relative to the sleeve 20.

In FIG. 7, a spring 21 of an actuator 30 is coaxial to the pivot axis a. One end 22 of the spring 21 is supported on a contact surface 41 of a profile element 43 of a tension rod 23 that is also part of the actuator 30. The tension rod 23 is rigidly connected to the drive part 29. Another spring end 24 of the spring 21 is supported on a stop face 25 that is rigidly connected to the sleeve 18. The sleeve 18 has a stop face 27 that, according to FIG. 7, interacts with a driving face 28 of the drive part 29 of the actuator 30.

The profile element 43 is rotationally connected to the sleeve 18, for example by a spline shaft profile. In this way, pivoting of the arm 13 in direction $u_1$ is damped by a damper 39. A driver 45 of the damper is rotationally connected to the profile element 43.

FIG. 7 shows a spring 31 that urges the arm 13 in the pivot direction $u_1$. The spring 31 is designed as a torsion spring and one spring end thereof is supported on the base 19, e.g. on the housing 37, and another spring end is supported on the sleeve 18.

The actuator 30 is designed as a linear drive and has a motor 32 and a spindle 33. The spindle 33 is provided with an external thread 34 that is engaged in an internal thread 35 of a spindle nut 40 that is driven by the motor 32 and mounted on the motor 32. The motor 32 is rigidly connected to the drive part 29. The spindle 33 is mounted in bearings 36a and 36b that are retained on the housing 37 of the armrest 10. A guide rod 42 that is merely indicated by dashed lines is used as an anti-turn device for the drive part 29.

A controller (not shown) can be activated for example by a switch or a sensor. This causes the motor 32 to move the spindle nut 40 in a first direction of rotation, such that the drive part 29 that is rigidly connected to the motor 32 moves along the spindle 33 in direction $y_1$. In this case, the drive part 29 carries along the assembly consisting of the sleeve 18, tension rod 23 and springs 21 and 31, and moves the assembly relative to the sleeve 20, in direction $y_1$, out of the inner position according to FIG. 7 and into the outer position according to FIG. 8.

In this case, the sleeve 18 is guided by an axial guide of the mount 17. This has a projection 44 that is formed on the sleeve 18 and engages in a guide track 46 that extends in direction $y_1$ and is formed in the housing 37. The guide track 46 is designed such that the projection 44 has degrees of freedom in direction $y_1$ and $y_2$, and rotation of the sleeve 18 in direction $u_1$ and $u_2$ is prevented.

The guide track 46 ends in the outer position. Owing to the biasing of the arm 13 by the spring 31 in direction $u_1$, the projection 44 is moved into a guide track or slot 47 of the mount 17 that forms a rotational guide that prevents axial movement of the projection 44 in the directions $y_1$ and $y_2$ but allows angular movement in the directions $u_1$ and $u_2$. The guide slot 47 thus prevents return movement of the sleeve 18 in direction $y_2$.

Figure 12:
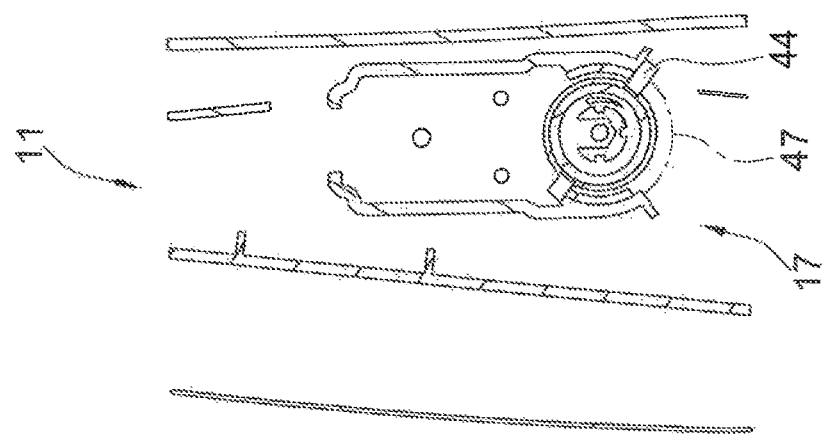
FIG. 12 is a sectional view according to the cutting line F-F in FIG. 6.
Figure 11:
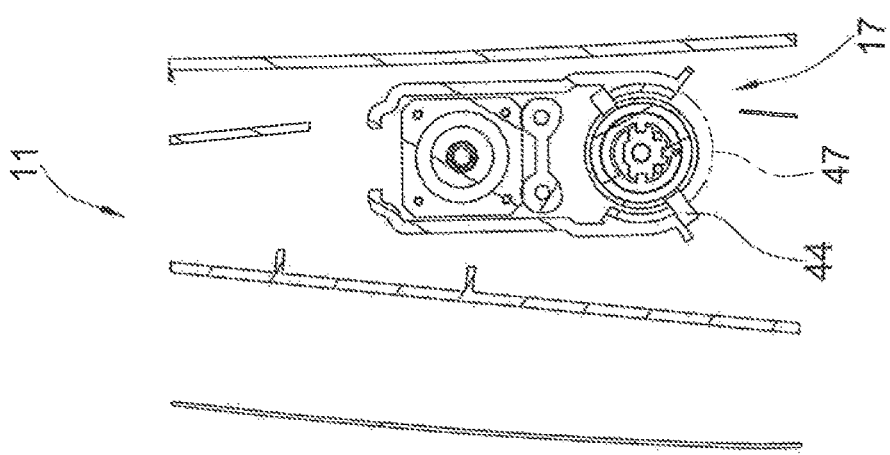
FIG. 11 is a sectional view according to the cutting line E-E in FIG. 5.
Figure 10:
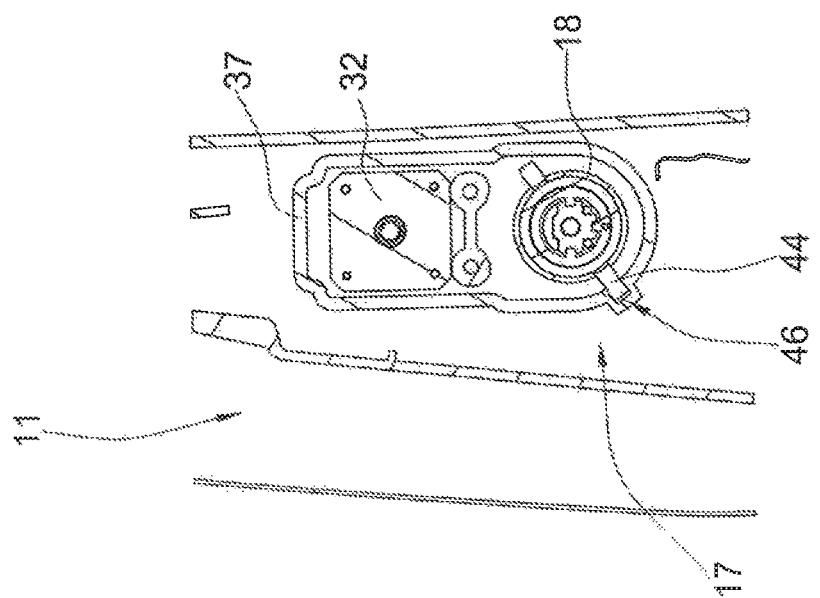
FIG. 10 is a sectional view according to the cutting line D-D in FIG. 4.

The arm 13 is biased by the spring 31, into the secondary position according to FIG. 9, wherein the projection 44 moves, in the guide track 47, into the position, shown in FIG. 12, at an end of the guide track 47. In the process, the damper 39 brakes movement of the arm 13 in direction $u_1$. In addition, the arm 13 could be braked by a separate spring approximately 20 degrees before reaching the secondary position, which separate spring is tensioned in this pivoting range until the secondary position is reached.

The motor 32 is now driven such that the pinion 40 moves the drive part 29 in direction $y_2$, wherein the tension rod 23 that is rigidly connected to the drive part 29 is entrained, together with the profile element 43, in direction $y_2$, and in the process tensions the spring 21 (see FIG. 9).

If the arm 13 is now intended to be moved into the non-use position, said support is pivoted manually about the pivot axis a in direction $u_2$, opposite the restoring force of the spring 31, until the primary position according to FIG. 8 is reached. In the process, the spring 31 is tensioned again. When the primary position is reached that corresponds to the outer position, the arm 13 is moved by the spring 21 in direction $y_2$, into the inner position, wherein the projection 44 runs along the guide track 46.

Alternatively to the embodiment described here, the arm of the arm rest could be guided by a helical guide track, wherein movement between the inner position and the outer position, and movement between the primary position and the secondary position takes place simultaneously.

The invention claimed is:

1. An armrest comprising:
   a base;
   an arm carrying a second guide tube;
   a mount supporting the arm on the base for movement angularly of a pivot axis between a use position and a non-use position, the arm being movable relative to the base by the mount axially of the pivot axis between an inner position and an outer position;
   a damper for damping at least a portion of movement of the arm from the non-use position into the use position;
   an axial guide track on the mount in which the second guide tube is movable axially;
   a first guide tube on the mount and engageable with the second guide tube;
   an angular guide track in which the second guide tube is movable angularly;
   an actuator motor having a drive part movable between a first and a second position in order to displace the arm in a first direction at least partially between the inner position and the outer position;
   a rotationally effective spring urging the arm from the non-use position into the use position; and
   an axially effective spring inside at least one of the first and second guide tubes and tensioned by axial movement of the drive part of the actuator motor, the arm being biased axially by the axially effective spring in a second direction opposite the first direction.

2. The armrest according to claim 1, wherein the first guide tube and the second guide tube are movable telescopically with respect to one another.

3. The armrest according to claim 1, wherein, on movement of the drive part between the first position and the second position, the second guide tube is displaced relative to the first guide tube between the inner position and the outer position.

4. The armrest according to claim 1, wherein the second guide tube has a stop face that interacts with a driving surface of the drive part such that the second guide tube is entrained when the drive part moves in a first direction and the second guide tube separates from the drive part on movement thereof in a second direction.

5. The armrest according to claim 1, further comprising:
   a latch for locking the second guide tube in the outer position.

6. The armrest according to claim 1, further comprising:
a tension rod rigidly connected to the drive part of the actuator motor and a first spring end of the axially effective spring is supported on the tension rod.

7. The armrest according to claim 6, wherein the axially effective spring is tensioned by the tension rod when the drive part moves from the second position into the first position.

8. The armrest according to claim 1, wherein a second spring end of the axially effective spring is supported on a contact surface on the second guide tube.

9. The armrest according to claim 1, wherein the second guide tube is moved into the outer position when the drive part moves from the first position into the second position.

10. The armrest according to claim 1, wherein the actuator motor is effective linearly.

11. The armrest according to claim 1, wherein the axial guide track is an axially extending groove receiving the second guide tube and the angular guide track is a groove extending angularly from the axially extending groove and also receiving the second guide tube, whereby the second guide tube can move between the grooves.

12. An armrest comprising:
a base;
an arm carrying a second guide tube;
a mount supporting the arm on the base for movement angularly of a pivot axis between a use position and a non-use position, the arm being movable relative to the base by the mount axially of the pivot axis between an inner position and an outer position and angularly about the pivot axis between a non-use and a use position;
an axial guide track on the mount in which the second guide tube is movable axially;
a first guide element on the mount and engageable with the second guide tube;
an angular guide track in which the second guide tube is movable angularly;
an actuator motor having a drive part movable between a first and a second position in order to displace the arm in a first direction at least partially between the inner position and the outer position, the second guide element having a stop face that interacts with a driving surface of the drive part such that the second guide element is entrained when the drive part moves in a first direction and the second guide element separates from the drive part on movement thereof in a second direction;
a rotationally effective spring for urging the arm from one of the non-use and use positions into the other of the non-use and use positions; and
an axially effective spring inside the tube and braced between the tube and the drive part tensioned by axial movement of the drive part of the actuator motor, the arm being movable axially by the axially effective spring in a second direction opposite the first direction.

13. An armrest comprising:
a base;
an arm carrying a second guide element;
a mount supporting the arm on the base for movement angularly of a pivot axis between a use position and a non-use position, the arm being movable relative to the base by the mount axially of the pivot axis between an inner position and an outer position and angularly about the pivot axis between a non-use and a use position;
an axial guide track on the mount in which the second guide element is movable axially;
a first guide element on the mount and engageable with the second guide element;
an angular guide track in which the second guide element is movable angularly;
an actuator motor having a drive part movable between a first and a second position in order to displace the arm in a first direction at least partially between the inner position and the outer position, the second guide element having a stop face that interacts with a driving surface of the drive part such that the second guide element is entrained when the drive part moves in a first direction and the second guide element separates from the drive part on movement thereof in a second direction;
a rotationally effective spring urging the arm from one of the non-use and use positions into the other of the non-use and use positions; and
an axially effective spring tensioned by axial movement of the drive part of the actuator motor, the arm being movable axially by the axially effective spring in a second direction opposite the first direction.

\* \* \* \* \*